United States Patent
Bastide et al.

(10) Patent No.: US 9,871,834 B2
(45) Date of Patent: Jan. 16, 2018

(54) GOAL-BASED CONNECTION MANAGEMENT BETWEEN PARTIES

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 14/560,051

(22) Filed: Dec. 4, 2014

(65) Prior Publication Data
US 2016/0164928 A1 Jun. 9, 2016

(51) Int. Cl.
*H04L 29/06* (2006.01)
*H04L 12/58* (2006.01)
(Continued)

(52) U.S. Cl.
CPC ........... *H04L 65/403* (2013.01); *H04L 51/32* (2013.01); *H04L 67/22* (2013.01); *H04W 4/08* (2013.01); *H04W 4/206* (2013.01)

(58) Field of Classification Search
CPC ......... H04L 51/00–51/32; H04L 65/00–65/80; H04L 67/22; H04W 4/00–4/206
See application file for complete search history.

(56) References Cited

U.S. PATENT DOCUMENTS 8,370,425 B2  2/2013 Cheng et al.
2008/0288322 A1* 11/2008 Kennedy ............... G06Q 10/06
                                                          705/7.15
(Continued)

FOREIGN PATENT DOCUMENTS

WO   2005074445 A2   8/2005

OTHER PUBLICATIONS

IBM, "SPSS Text Analytics for Surveys", IBM Corporation, <http://www-03.ibm.com/software/products/en/spss-text-analytics-surveys>, retrieved Dec. 3, 2014, pp. 1-2.
(Continued)

*Primary Examiner* — Clayton R Williams
(74) *Attorney, Agent, or Firm* — Law Office of Jim Boice

(57) ABSTRACT

A monitoring computer system receives a message, from a first party, which identifies a goal of the first party. The monitoring computer system receives an identity of a second party that has been selected by the first party to assist the first party in achieving the identified goal of the first party. An electronic communication connection is created for electronic communications between the first party and the second party, wherein the electronic communications are related to accomplishing the goal of the first party. The electronic communications between the first party and the second party are monitored by executing message analytics to determine a status of the goal of the first party. In response to determining that the goal of the first party has reached a predefined status, a predefined action that has been associated with the predefined status of the goal is executed.

18 Claims, 3 Drawing Sheets

(51) Int. Cl.
*H04W 4/08* (2009.01)
*H04L 29/08* (2006.01)
*H04W 4/20* (2009.01)

(56) References Cited

U.S. PATENT DOCUMENTS

| | | |
|---|---|---|
| 2010/0185474 A1* | 7/2010 | Frank .............. G06Q 10/06311 |
| | | 705/7.15 |
| 2010/0185630 A1 | 7/2010 | Cheng et al. |
| 2011/0246631 A1 | 10/2011 | Baker et al. |
| 2011/0307553 A1 | 12/2011 | Ghang et al. |
| 2013/0104246 A1* | 4/2013 | Bear ....................... H04L 63/10 |
| | | 726/28 |
| 2013/0132866 A1 | 5/2013 | Shafique |
| 2013/0179438 A1 | 7/2013 | Coldicott et al. |
| 2014/0006400 A1 | 1/2014 | Bastide et al. |
| 2014/0215472 A1* | 7/2014 | Motahari Nezhad ...................... |
| | | G06Q 10/1097 |
| | | 718/102 |
| 2015/0112770 A1* | 4/2015 | Phillips .............. G06Q 10/0639 |
| | | 705/7.38 |

OTHER PUBLICATIONS

IBM, "SPSS Statistics", IBM Corporation, <http://www-01.ibm.com/software/analytics/spss/products/statistics/>, retrieved Dec. 3, 2014, pp. 102.

Anonymous, "Natural Language Processing", Wikimedia Foundation, Inc., last modified Nov. 27, 2014, retrieved Dec. 3, 2014, pp. 1-11.

\* cited by examiner

GOAL-BASED CONNECTION MANAGEMENT BETWEEN PARTIES

BACKGROUND

The present disclosure relates to the field of communication networks, and specifically to selectively establishing communication networks. Still more particularly, the present disclosure relates to establishing communication networks based on established goals of communicating parties.

Online social networks are a mechanism to connect people and information in logical and organized ways, while enabling sharing and processing of information between the users. The most common mechanisms of sharing and processing information are an inbox (for e-mail), a wall (comments made about a particular item in a social network webpage), an activity stream (describing activities of an owner of a social network webpage), and a profile (of the user of a social media webpage). These mechanisms enable one to rapidly share information with others and gather information from others in the networks.

With the rise of business users who use the online social networks, there is an additional layer of complexity to distribute news and work items to the right people at the right time. The distribution requires a strong and effective online social network. Business users who establish and build strong effective social networks have curated their social networks through extensive work and time spent. As a user's job evolves, the online social networks require curation to make sure the social networks are current, dynamic, effective, and not overwhelming.

SUMMARY

In one or more embodiments of the present invention, a method, computer program product, and/or computer system manages electronic communication connections. A monitoring computer system receives a message, from a first party, which identifies a goal of the first party. The monitoring computer system receives an identity of a second party that has been selected by the first party to assist the first party in achieving the identified goal of the first party. An electronic communication connection is created for electronic communications between the first party and the second party, wherein the electronic communications are related to accomplishing the goal of the first party. The electronic communications between the first party and the second party are monitored by executing message analytics to determine a status of the goal of the first party. In response to determining that the goal of the first party has reached a predefined status, a predefined action that has been associated with the predefined status of the goal is executed.

DETAILED DESCRIPTION

Figure 1:
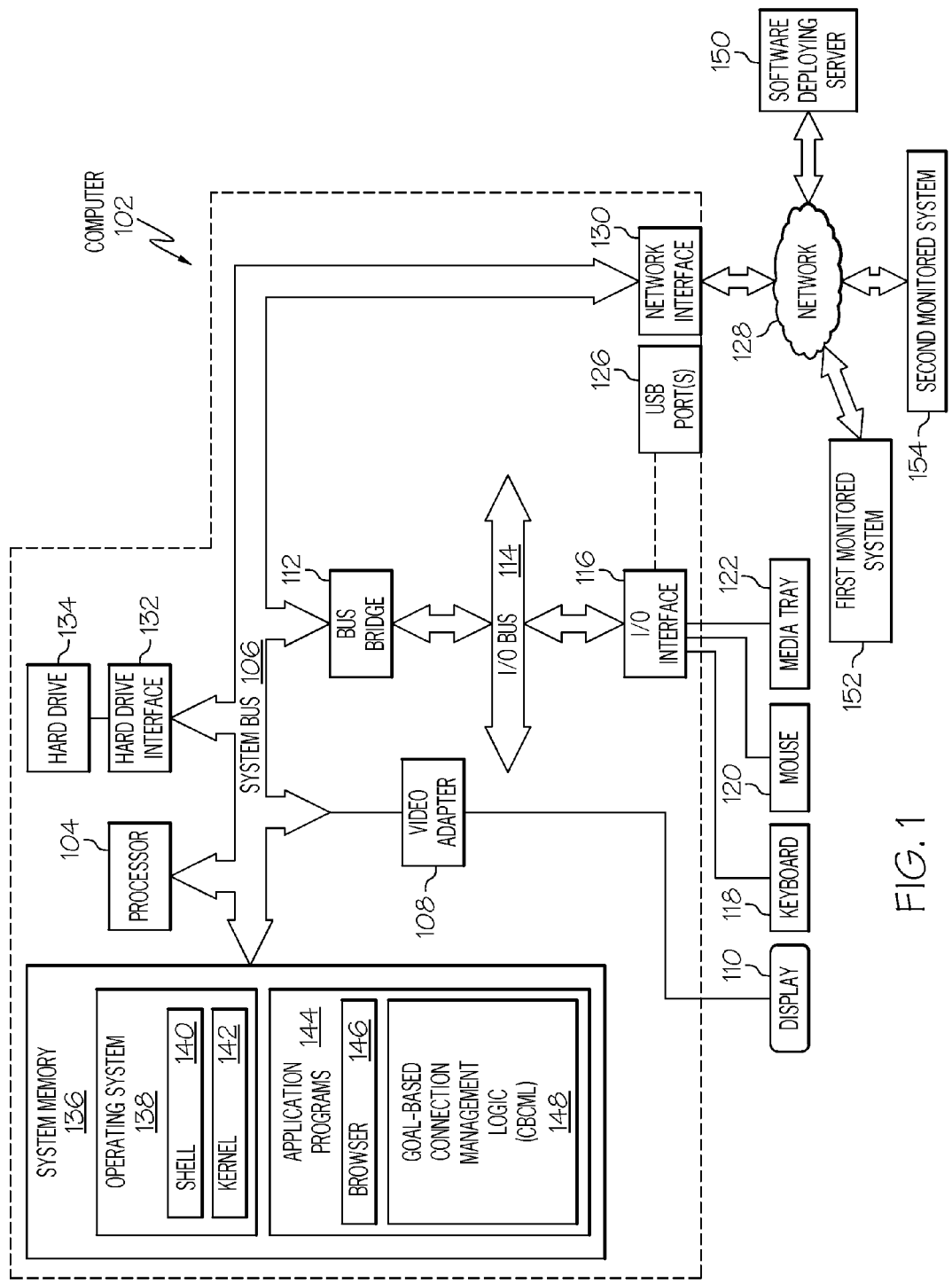
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a first monitored system 152 and/or a second monitored system 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Goal-Based Connection Management Logic (GBCML) 148. GBCML 148 includes code for implementing the processes described below, including those described in FIGS. 2-3. In one embodiment, computer 102 is able to download GBCML 148 from software deploying server 150, including in an on-demand basis, wherein the code in GBCML 148 is not downloaded until needed for execution. Note further that, in one embodiment of the present invention, software deploying server 150 performs all of the functions associated with the present invention (including execution of GBCML 148), thus freeing computer 102 from having to use its own internal computing resources to execute GBCML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
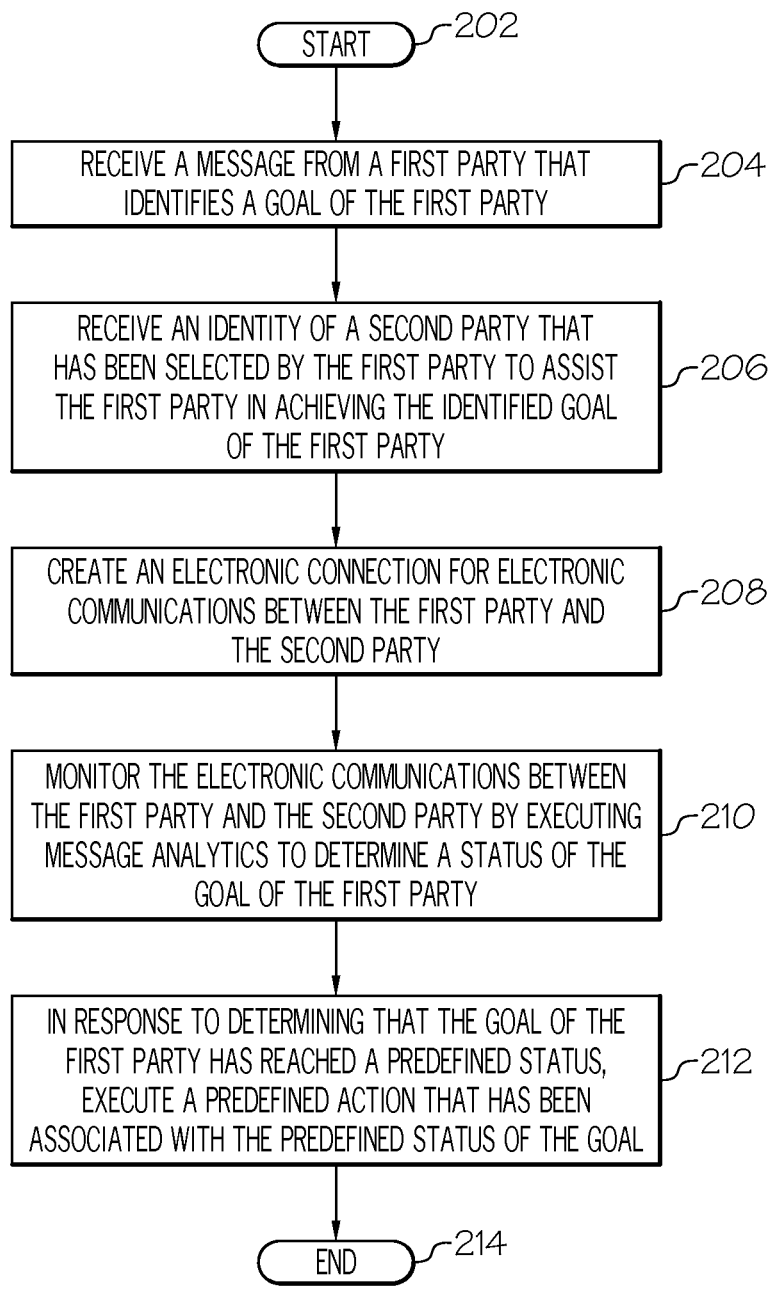
FIG. 2 is a high level flow-chart of one or more operations performed by one or more hardware devices to manage electronic communication connections based on set goals.

With reference now to FIG. 2, a high level flow-chart of one or more operations performed by one or more hardware devices to manage connections based on set goals is presented.

After initiator block 202, a monitoring computer system receives a message from a first party, wherein the message identifies a goal of the first party (block 204). For example, the message may be an e-mail message, a posting on a "wall" in a social media website (i.e., comments on a particular subject), an entry in an activity stream (i.e., a listing of activities being performed by the user of a social media website), a profile description that includes accomplishments of the host of a social media website, etc.

The goal of the first party may be selected from a menu, or may be custom-entered. For example, consider user interface 302 in FIG. 3. User interface 302 may be a user interface (UI) for an e-mail program, a social media webpage, and instant messaging application, etc. As shown in field 304, the user is able to select particular goals that he/she wants to achieve. In an embodiment in which the first party is using the first monitored system 152 shown in FIG. 1, these user-selected goal(s) are received by the monitoring computer system (e.g., computer 102 in FIG. 1), which monitors communication traffic, postings on a social media webpage, and other electronic entries made by the user of the first monitored system 152.

As described in block 204, the monitoring computer system then receives an identity of a second party that has been selected by the first party to assist the first party in achieving the identified goal of the first party. Returning again to FIG. 3, the field 304 also allows the first party to identify who will be working with her/him to achieve her/his goal(s). This identity may be an e-mail address, a personal name (which can be linked to e-mail addresses, webpages, social media websites, etc. for that second party), etc. In an embodiment in which the second party is using the second monitored system 154 shown in FIG. 2, this allows the monitoring computer system (e.g., computer 102 in FIG. 1) to monitor communication traffic, postings on a social media webpage, and other electronic entries made by the user of the second monitored system 154.

As described in block 208 of FIG. 2, the monitoring computer system then creates an electronic communication connection (e.g., via a social network) for electronic communications between the first party and the second party, wherein the electronic communications are related to accomplishing the goal of the first party. For example, assume that the first party and the second party are both members of a social media service, but are not currently linked together in a group, as "friends", etc. More specifically, even if the first party and the second party are associated via the social media service, the social media service may offer a private relationship between two parties. As such, the monitoring computer system will automatically create such a private relationship group between only the first party and the second party, based on the information received during the activities described in block 204 and block 206. That is, the monitoring computer system determines, through data mining and data analytics, that 1) the first party has a certain goal, and 2) that the second party will be helping the first party reach that goal. Based on this information, the monitoring computer system sets up the first party and the second party in a new private group on the social media website.

As described in block 210 of FIG. 2, the monitoring computer system then monitors the electronic communications between the first party and the second party, wherein said monitoring executes message analytics to determine a status of the goal of the first party. That is, electronic communications (or a lack thereof) will indicate that the goal has been achieved, is progressing according to schedule, is behind schedule, has been abandoned, has been changed, etc.

For example, assume that the first party's goal was to complete a certification program for a particular technology, and that the second party will mentor the first party through this process. Electronic communications (e-mail, social media postings, etc.) between the two parties indicates the status of the first party reaching this goal. Key words such as "completed", when taken in context, may indicate that the goal has been reached. Other key words such as "quit" may be interpreted as the goal being abandoned. Other key words such as "change" may indicate that the first party has decided to be certified in another program, rather than the first certification program.

As described in block 212 of FIG. 2, in response to determining that the goal of the first party has reached a predefined status, the monitoring computer system executes a predefined action that has been associated with the predefined status of the goal. The flow-chart ends at terminator block 214.

In an embodiment of the present invention, the predefined action is to display the predefined status of the goal to the first party and to the second party. For example, assume that there are ten steps to reaching a particular goal, such as being certified in a particular operating system. Each time the first party completes one of the ten steps, the newly-completed step is displayed to the first party and/or the second party on a user-interface, such as a dashboard (e.g., a user interface that provides a summary of activities). In one embodiment, the status update includes color coded indicators of completed steps, plus color coded indicators of incomplete steps that still need to be accomplished in order to reach the first party's goal.

In an embodiment of the present invention, the predefined status is a completion of the goal. In this embodiment, completing the goal results in the monitoring computer system disconnecting the electronic communication connection between the first party and the second party. That is, once the goal is reached, then the communication connection (e.g., membership in a special "group" on a social media website) is terminated.

In an embodiment of the present invention, the message analytics identifies key words in the electronic communications that are related to the goal of the first party. In response to determining, by the monitoring computer system, that a quantity of the key words in the electronic communications between the first party and the second party falls below a predetermined frequency over a predefined period of time, the electronic communication connection between the first party and the second party is disconnected. For example, assume that the first party wants to be certified in "Program A". Electronic communications between the first party and his/her mentor (the second party) would likely contain references to "Program A". However, if no mention is made of "Program A" within some predefined period of time, then an assumption is made that the first party is no longer interested in (or working towards) reaching his/her goal of being certified in "Program A". This assumption leads the monitoring computer system to automatically terminate the special electronic communication connection (e.g., a social media wall, group, etc.) that was created for the goal of helping the first party reach his/her goal of being certified in "Program A".

Similarly, in an embodiment of the present invention, the monitoring computer system receives a goal abandonment message from the first party, wherein the goal abandonment message identifies an abandonment of the goal by the first party. In response to receiving the goal abandonment message from the first party, the monitoring computer system disconnects the electronic communication connection between the first party and the second party. That is, if the first party expressly states (e.g., through the UI 302 shown in FIG. 3) that he/she no longer wants to be certified in "Program A", then the monitoring computer system will automatically terminate the special electronic communication connection (e.g., a social media wall, group, etc.) that was created for the goal of helping the first party reach his/her goal of being certified in "Program A".

In an embodiment of the present invention, the message analytics identifies key words in the electronic communications that are related to the goal of the first party. In response to determining, by the monitoring computer system, that a quantity of key words in the electronic communications between the first party and the second party falls below a predetermined frequency over a predefined period of time, a new electronic communication connection between the first party and a third party that has been predetermined to be able to assist the first party in reaching the goal of the first party is established. Again, assume that the first party wants to be certified in "Program A". Electronic communications between the first party and his/her mentor (the second party) would likely contain references to "Program A". However, if no mention is made of "Program A" within some predefined period of time, then an assumption is made that the second party is no longer helping the first party reach his/her goal of being certified in "Program A". This assumption leads the monitoring computer system to automatically generate a new electronic communication connection (e.g., a social media wall, group, etc.) with a new party ("third party"), who will now help the first party reach his/her goal of being certified in "Program A".

In an embodiment of the present invention, the monitoring computer system monitors public message postings by the first party, wherein said monitoring executes message analytics to further determine the status of the goal of the first party. That is, the present invention first monitors communications between the first party (who wants to reach a certain goal) and his/her mentor (the second party) in order to determine the status of how close the first party is to reaching his/her stated goal. However, another indicator of this status is to monitor other public message postings (e.g., tags on a photo, other social media postings, blog postings, etc.) to determine this status. For example, if the first party posts on a public asynchronous social media site (that allows anyone to follow his/her activities) that he/she is "90% complete in being certified in Program A", then this information is used to further determine the status of the goal of the first party in reaching his/her goal.

Figure 3:
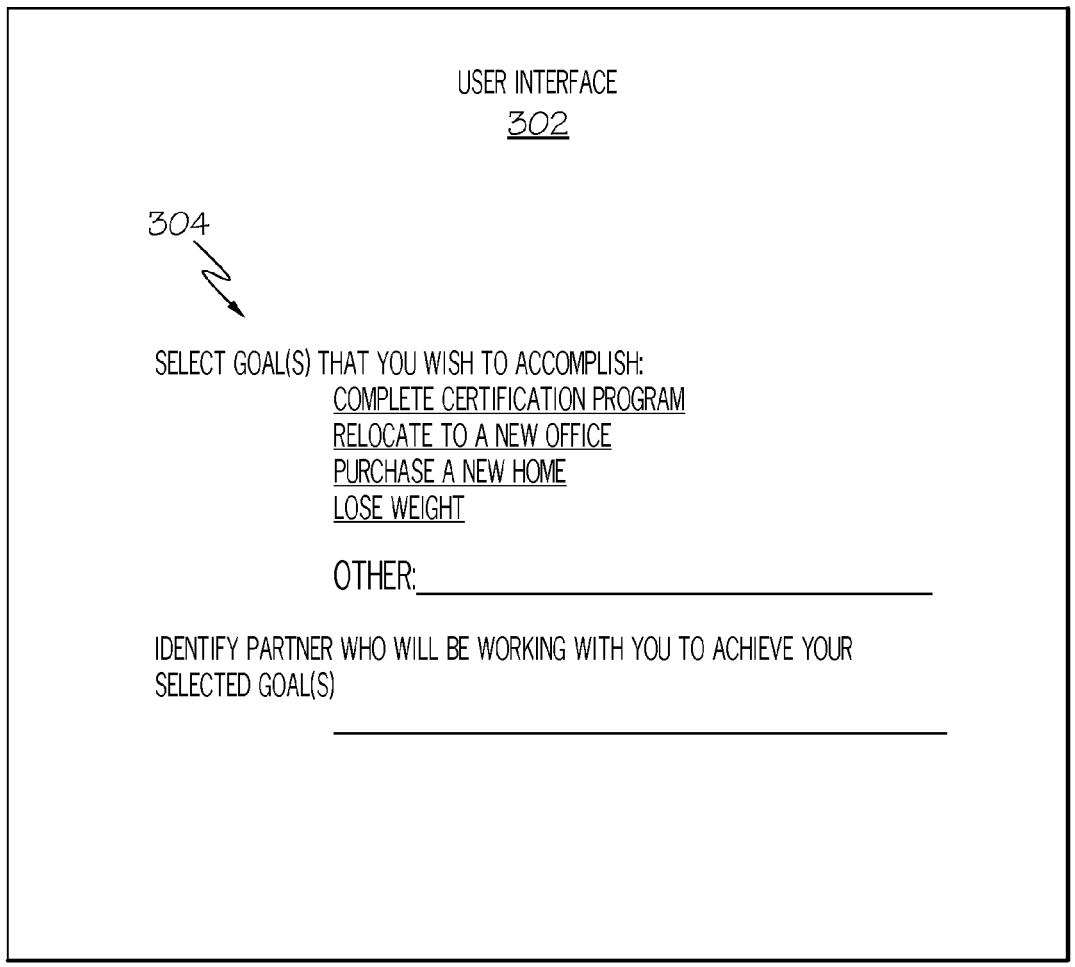
FIG. 3 illustrates an exemplary user interface with which the present invention may be implemented.

In an embodiment of the present invention, the monitoring computer system presents a set of predefined goals and a goal entry field to the first party, and then receives a blend of user-selected goals from the predefined goals and a goal entry from the goal entry field as the goal of the first party. That is, as shown in FIG. 3, the first party may select one or more goals from a predefined menu of goals, add another goal of his/her own drafting, and then combined the menu-provided and user-drafted goals into a blended goal. For example, the menu-provided goals may be "Be certified in Operating System A" and "Learn how to program in C++". The user-drafted goal may be "Move to Colorado". These three goals are then combined into a blended goal, which may be achieved with the help of one or more mentors (second parties).

In an embodiment of the present invention, the monitoring computer system determines that the first party and the second party have failed to exchange electronic communications during a predefined period of time. In response to the monitoring computer system determining that the first party and the second party have failed to exchange electronic communications during the predefined period of time, a message is transmitted to the first party and the second party indicating that the goal of the first party has been reached. That is, in this embodiment, if there are no more messages about "Program A" between the first party and the second party over the course of some predefined period of time (e.g., the past three months), then an assumption is made that the first party has become certified in "Program A", and a message is transmitted to the second party (with a courtesy copy to the first party) indicating that the first party is now certified in "Program A", and thus has reached her/his goal.

Exemplary Use Case:

Assume now that Alice, Bob, Charlie and Dave are members of an online social network, and that Alice, Bob, and Charlie are connected to one another. Assume further that Alice chooses to connect with Dave.

The monitoring computer system prompts Alice to select a goal for connecting with Dave. Alice then enters "Solve Project A". Alice and Dave communicate back and forth on Project A. The monitoring computer system detects traffic which matches the profiles for "Project A" and "Solve". That is, electronic communication traffic (e-mail, website postings, social media walls, etc.) are analyzed. If Alice mentions "Solved Project A" or closes off some activity (e.g., terminates a "group" in her social media webpage), this indicates that that project is complete (and thus the goal has been reached). In one or more embodiments, the monitoring computer system then prompts Alice to see if the system should remove the Alice and Dave connection.

In one or more embodiments of the present invention, an online social network is used by the parties to communicate with one another. The connections between the parties may be symmetric (i.e., such that two parties are able to send messages back and forth between the two parties), or asymmetric (i.e., a second party only sends messages and a first party only receives messages from the second party, or vice versa).

As described herein, the parties communicate (either symmetrically or asymmetrically) via messages to an entire social network (e.g., a "public" posting), or to part of a social network (i.e., to a private list, circle, or specific group).

The social network enables users to share active content (e.g., indicators that a user "likes" a posting, active links that take a user, via a linked universal resource locator (URL), to another webpage or other resource); textual content (i.e., formatted or unformatted text describing what a person is doing/working on); etc.

As described herein, the user connects with another user. The user is prompted to enter a goal. The goals are free formed and/or from a preset list (e.g., "Complete a Sale for Company X", "Improve Career Elements", etc.). In one or more embodiments, the goals are a combination of free formed descriptions of a goal and/or menu-offered goals. For example, assume that the user is presented with the goal "Make a Sale for Company X". This goal links to a formal natural language description, which interprets "Make a Sale for Company X" by extracting key terms (e.g., "Make", "Sale", "Company X").

In one or more embodiments of the present invention, goals are stored per connection. That is, each electronic communication connection may be devoted to a particular goal. Thus, when the goal is reached, the electronic communication connection is terminated.

Similarly, goals may be applied to a subset of a network. That is, assume that different pathways in a network go to different resources. For example, one electronic communication connection is to a personal (non-business related) social media website, while another electronic communication connection is to a professional (business related) social media website. Once the goal of the first party and the mentor (second party) for reaching that goal are identified, the monitoring computer system creates a special electronic pathway between the first party and the second party depending on whether the goal is personal or professional. That is, if the goal is "I want to lose weight", then the monitoring computer system creates a special electronic pathway between the first party and the second party via a personal (non-business) social media website. However, if the goal is "I want to prepare for the job of being manager of my department at work", then the monitoring computer system creates a special electronic pathway between the first party and the second party via a professional (business) social media website.

The goal of the first party may be secret or open, personal or public, bidirectional or unidirectional. The goals may be progressive (e.g., Goals—Goal 1 reached, Work on goal 2).

As described herein, the present invention monitors online social network traffic. In one or more embodiments of the present invention, this network traffic is classified by its content. If the content contains similar or related text to the text in the goals, then it is added to the evidence that the goal is being met.

As described herein, one or more embodiments of the invention determine whether or not there is a high confidence level of the goal being met. This high confidence level may be according to how many classified posts are posted by the first party; how recent such posts by the first party are (e.g., if the posts are "stale", then an assumption is made that progress towards reaching the goal has stalled); an overlap between the posts and the description of the goal (i.e., how closely the terms in the posts and the goal match); etc.

In one embodiment of the present invention, the user is prompted to select an action based on the goal being achieved. That is, if the monitoring computer system determines that a next step needs to be performed in order to continue to move toward a goal, that step may be prompted to the first party. For example, the monitoring computer system may prompt the first party with a message "It is time to complete Chapter 2 in your course syllabus").

As described herein, the first party's goal may be deferred or changed; electronic communication connections may be removed (based on the status of whether or not the goal has or is being reached); etc. In one embodiment, the present invention automatically removes the electronic communication connection based on the time since the goal was last discussed.

The present invention may prompt the user to change the update and frequency of updates displayed by the person. Similarly, the present invention may label a goal as stagnant, and look for similar goals and introduce people with similar goals.

In one or more embodiments, the present invention manages online social networks by: prompting the user to select a goal for a social network connection monitoring the user's social network interactions; and/or determining the status of the goal in relation to the interactions managing the network connection based on the status.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for managing electronic communication connections, the computer-implemented method comprising:
   receiving, by a monitoring computer system, a message from a first party, wherein the message identifies a goal of the first party;
   receiving, by the monitoring computer system, an identity of a second party that has been selected by the first party to assist the first party in achieving the identified goal of the first party;
   creating, by the monitoring computer system, an electronic communication connection for electronic communications between the first party and the second party, wherein the electronic communications are related to accomplishing the goal of the first party;
   monitoring, by the monitoring computer system, the electronic communications between the first party and the second party, wherein said monitoring executes message analytics to determine a status of the goal of the first party, and wherein the message analytics identifies key words in the electronic communications that are related to the goal of the first party;
   in response to determining that the goal of the first party has reached a predefined status, executing, by the monitoring computer system, a predefined action that has been associated with the predefined status of the goal; and
   in response to determining, by the monitoring computer system, that a quantity of the key words in the electronic communications between the first party and the second party falls below a predetermined frequency over a predefined period of time, disconnecting the electronic communication connection between the first party and the second party.

2. The computer-implemented method of claim 1, wherein the electronic communication connection is via a social network for electronic communications.

3. The computer-implemented method of claim 1, wherein the predefined action is to display the predefined status of the goal to the first party and to the second party.

4. The computer-implemented method of claim 1, wherein the predefined status is a completion of the goal.

5. The computer-implemented method of claim 4, further comprising:
   disconnecting the electronic communication connection between the first party and the second party.

6. The computer-implemented method of claim 1, wherein the message analytics identifies key words in the electronic communications that are related to the goal of the first party, and wherein the computer-implemented method further comprises:
   in response to determining, by the monitoring computer system, that a quantity of key words in the electronic communications between the first party and the second party falls below a predetermined frequency over a predefined period of time, establishing a new electronic communication connection between the first party and a third party that has been predetermined to be able to assist the first party in reaching the goal of the first party.

7. The computer-implemented method of claim 1, further comprising:
   monitoring, by the monitoring computer system, public message postings by the first party, wherein said monitoring executes message analytics to further determine the status of the goal of the first party.

8. The computer-implemented method of claim 1, further comprising:
   receiving, by the monitoring computer system, a goal abandonment message from the first party, wherein the goal abandonment message identifies an abandonment of the goal by the first party; and
   in response to receiving the goal abandonment message from the first party, disconnecting, by the monitoring computer system, the electronic communication connection between the first party and the second party.

9. The computer-implemented method of claim 1, further comprising:
   presenting, by the monitoring computer system, a set of predefined goals and a goal entry field to the first party; and
   receiving a blend of user-selected goals from the predefined goals and a goal entry from the goal entry field as the goal of the first party.

10. The computer-implemented method of claim 1, further comprising:
    determining, by the monitoring computer system, that the first party and the second party have failed to exchange electronic communications during a predefined period of time; and
    in response to the monitoring computer system determining that the first party and the second party have failed to exchange electronic communications during the predefined period of time, transmitting a message to the first party and the second party indicating that the goal of the first party has been reached.

11. A computer program product for managing electronic communication connections, the computer program product comprising a computer readable storage medium having program code embodied therewith, wherein the computer readable storage medium is not a transitory signal per se, and wherein the program code is readable and executable by a processor to perform a method comprising:
    receiving a message from a first party, wherein the message identifies a goal of the first party;
    receiving an identity of a second party that has been selected by the first party to assist the first party in achieving the identified goal of the first party;
    creating an electronic communication connection for electronic communications between the first party and the second party, wherein the electronic communications are related to accomplishing the goal of the first party;
    monitoring the electronic communications between the first party and the second party, wherein said monitoring executes message analytics to determine a status of the goal of the first party, and wherein the message analytics identifies key words in the electronic communications that are related to the goal of the first party;
    in response to determining that the goal of the first party has reached a predefined status, executing a predefined action that has been associated with the predefined status of the goal; and
    in response to determining, by the monitoring computer system, that a quantity of key words in the electronic communications between the first party and the second party falls below a predetermined frequency over a predefined period of time, establishing a new electronic communication connection between the first party and a third party that has been predetermined to be able to assist the first party in reaching the goal of the first party.

12. The computer program product of claim 11, wherein the predefined action is to display the predefined status of the goal to the first party and to the second party.

13. The computer program product of claim 11, wherein the predefined status is a completion of the goal, and wherein the method further comprises:
disconnecting the electronic communication connection between the first party and the second party.

14. The computer program product of claim 11, wherein the message analytics identifies key words in the electronic communications that are related to the goal of the first party, and wherein the method further comprises:
in response to determining that a quantity of the key words in the electronic communications between the first party and the second party falls below a predetermined frequency over a predefined period of time, disconnecting the electronic communication connection between the first party and the second party.

15. A computer system comprising:
a hardware processor, a computer readable memory, and a computer readable storage medium;
first program instructions to receive a message from a first party, wherein the message identifies a goal of the first party;
second program instructions to receive an identity of a second party that has been selected by the first party to assist the first party in achieving the identified goal of the first party;
third program instructions to create an electronic communication connection via a social network for electronic communications between the first party and the second party, wherein the electronic communications are related to accomplishing the goal of the first party;
fourth program instructions to monitor the electronic communications between the first party and the second party, wherein said monitoring executes message analytics to determine a status of the goal of the first party, and wherein the message analytics identifies key words in the electronic communications that are related to the goal of the first party; and fifth program instructions to, in response to determining that the goal of the first party has reached a predefined status, execute a predefined action that has been associated with the predefined status of the goal;
sixth program instructions to, in response to determining that a quantity of the key words in the electronic communications between the first party and the second party falls below a predetermined frequency over a predefined period of time, disconnect the electronic communication connection between the first party and the second party; and wherein the first, second, third, fourth, fifth, and sixth program instructions are stored on the computer readable storage medium and executed by the processor via the computer readable memory.

16. The computer system of claim 15, wherein the predefined action is to display the predefined status of the goal to the first party and to the second party.

17. The computer system of claim 15, wherein the predefined status is a completion of the goal, and wherein the computer system further comprises:
seventh program instructions to disconnect the electronic communication connection between the first party and the second party; and wherein the seventh program instructions are stored on the computer readable storage medium and executed by the processor via the computer readable memory.

18. The computer system of claim 15, wherein the message analytics identifies key words in the electronic communications that are related to the goal of the first party, and wherein the computer system further comprises:
seventh program instructions to, in response to determining that a quantity of key words in the electronic communications between the first party and the second party falls below a predetermined frequency over a predefined period of time, establish a new electronic communication connection between the first party and a third party that has been predetermined to be able to assist the first party in reaching the goal of the first party; and wherein the seventh program instructions are stored on the computer readable storage medium and executed by the processor via the computer readable memory.

* * * * *